US011100458B2

(12) United States Patent
Dozortsev et al.

(10) Patent No.: US 11,100,458 B2
(45) Date of Patent: Aug. 24, 2021

(54) ASSET AND DEVICE MANAGEMENT

(71) Applicant: INTERNATIONAL BUSINESS MACHINES CORPORATION, Armonk, NY (US)

(72) Inventors: Boris Dozortsev, Newton, MA (US); Xinyu Wu, Bedford, MA (US); Alexander Nguyen, Chantilly, VA (US); Angela McCafferty, Herndon, VA (US); Krishnamohan Dantam, Chelmsford, MA (US); Subrat Mishra, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/131,230

(22) Filed: Sep. 14, 2018

(65) Prior Publication Data
US 2020/0090109 A1 Mar. 19, 2020

(51) Int. Cl.
*G06Q 10/08* (2012.01)
*G06Q 10/00* (2012.01)
*G06F 7/02* (2006.01)

(52) U.S. Cl.
CPC ............ *G06Q 10/087* (2013.01); *G06F 7/026* (2013.01)

(58) Field of Classification Search
CPC .............................. G06Q 10/087; G06F 7/026
See application file for complete search history.

(56) References Cited

U.S. PATENT DOCUMENTS

| 7,148,800 | B2 * | 12/2006 | Cunningham | G06Q 10/08 340/539.11 |
| 8,392,998 | B1 * | 3/2013 | Schrecker | H04L 63/1416 726/25 |
| 9,021,595 | B2 | 4/2015 | Schrecker et al. | |
| 2013/0132008 | A1 | 5/2013 | Borean et al. | |

(Continued)

FOREIGN PATENT DOCUMENTS

WO 2017085320 A1 5/2017

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Talia F Crawley
(74) *Attorney, Agent, or Firm* — Robert D. Bean

(57) ABSTRACT

According to one embodiment, a method, computer system, and computer program product for controlling an electronic device based on mapping sensors to a physical asset. Embodiments of the present invention may include controlling or sending commands to an electronic device associated with a physical asset based on a mapping, where the mapping involves creating one or more groupings, based on sensor data, grouping data, and asset data, wherein at least one grouping comprises a physical asset and one or more sensors, and wherein the asset data pertains to the physical asset. Embodiments of the present invention may further include ranking the groupings by confidence level, and mapping the sensors to the physical asset based on a user selection received in response to presenting, to a user, the ranked groupings based on the confidence levels.

20 Claims, 6 Drawing Sheets

(56) References Cited

U.S. PATENT DOCUMENTS

| | | | |
|---|---|---|---|
| 2016/0189174 A1* | 6/2016 | Heath | G06Q 30/0201 |
| | | | 705/7.29 |
| 2018/0060832 A1* | 3/2018 | Korsedal, IV | G06Q 10/20 |
| 2018/0204095 A1* | 7/2018 | Chillar | G21D 3/04 |
| 2018/0211718 A1* | 7/2018 | Heath | A01K 29/005 |
| 2019/0318417 A1* | 10/2019 | Gumaru | G06K 7/1413 |

* cited by examiner

ASSET AND DEVICE MANAGEMENT

BACKGROUND

The present invention relates, generally, to the field of computing, and more particularly to the field of information technology asset management.

Information technology (IT) asset management is the field that is concerned with the management of the hardware and software of computers and computer networks. It typically entails the gathering of detailed hardware and software inventory information which is then utilized to make decisions regarding hardware and software purchase and redistribution, and may also entail the mapping and tracking of physical IT assets for purposes of risk management, accurate resource and budget allocation, and accountability of assets' whereabouts. A major objective of the field of IT asset management is to minimize the amount of manual intervention in mapping physical assets, to maximize the amount of time IT professionals can spend on other tasks.

SUMMARY

According to one embodiment, a method, computer system, and computer program product for controlling an electronic device based on mapping sensors to a physical asset. Embodiments of the present invention may include controlling or sending commands to an electronic device associated with a physical asset based on a mapping, where the mapping involves creating one or more groupings, based on sensor data, grouping data, and asset data, wherein at least one grouping comprises a physical asset and one or more sensors, and wherein the asset data pertains to the physical asset. Embodiments of the present invention may further include ranking the groupings by confidence level, and mapping the sensors to the physical asset based on a user selection received in response to presenting, to a user, the ranked groupings based on the confidence levels.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
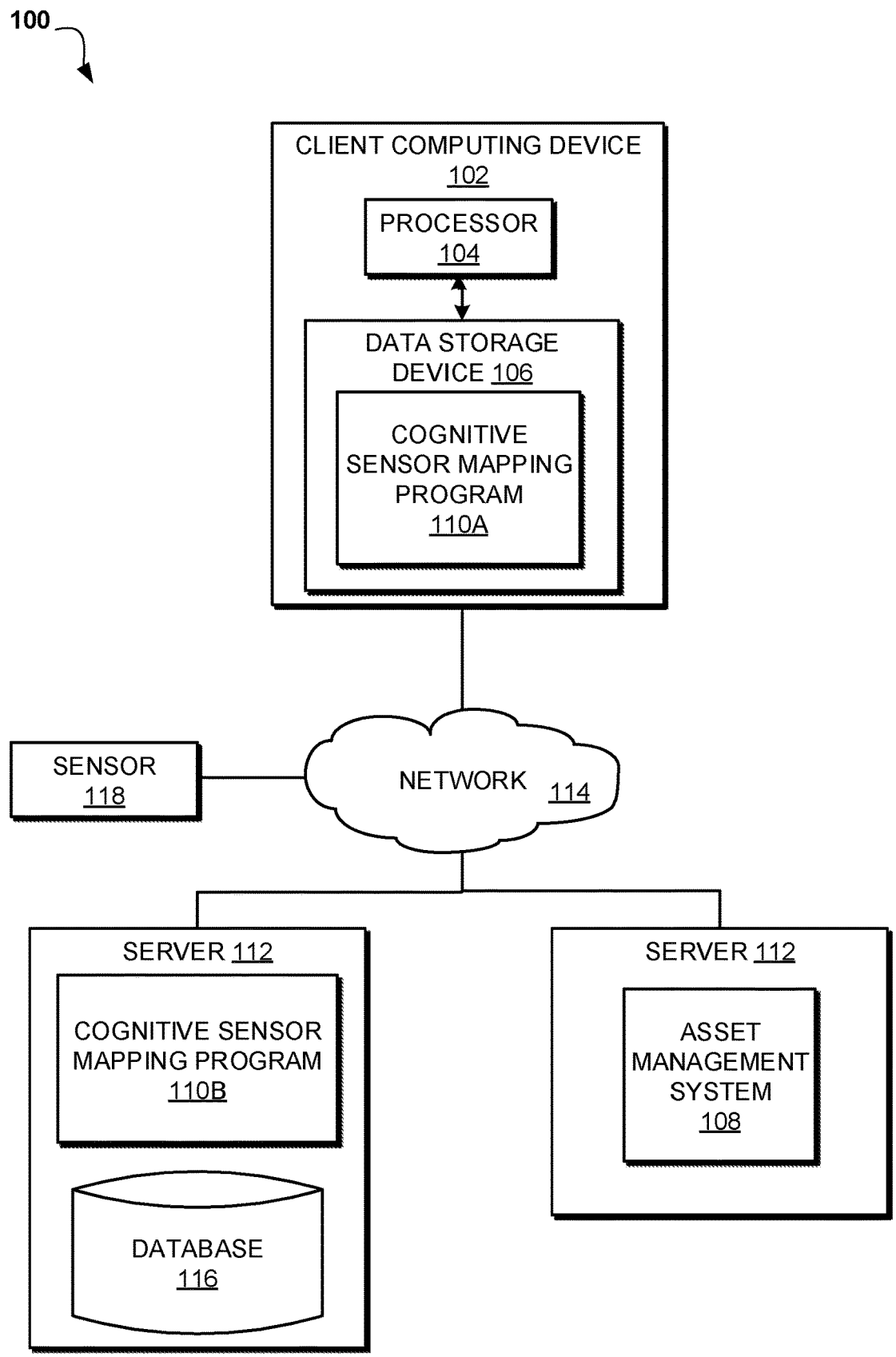
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the field of information technology asset management. The following described exemplary embodiments provide a system, method, and program product to, among other things, utilize cognitive learning and asset data to identify possible groupings for assets and sensors, and thereby map each asset to its corresponding sensor, and where such matching is impossible, suggest likely pairings to the user. Therefore, the present embodiment has the capacity to improve the technical field of the field of information technology asset management by utilizing cognitive learning and a series of rules to make inferences regarding the correct matching of sensors to assets, allowing the invention to function effectively despite incomplete data and improve its own efficiency and effectiveness over time, and allowing the invention to provide guidance to a user in cases where the invention cannot identify a correct mapping.

As previously described, information technology (IT) asset management is the field that is concerned with the management of the hardware and software of computers and computer networks. It typically entails the gathering of detailed hardware and software inventory information which is then utilized to make decisions regarding hardware and software purchase and redistribution, and may also entail the mapping and tracking of physical IT assets for purposes of risk management, accurate resource and budget allocation, and accountability of assets' whereabouts. A major objective of the field of IT asset management is to minimize the amount of manual intervention in mapping physical assets, to maximize the amount of time IT professionals can spend on other tasks.

In a typical organization that manages physical assets utilizing sensors, the sensor data is fed to an Internet of Things (IoT) Platform, which is an on-premises or cloud system that collects sensor data, for storage and analysis. The IoT Platform typically maintains a historian which stores the data and employs data aggregation techniques to take the data that is needed for further analysis. Usually such aggregated data is fed to asset management systems in a meaningful time period; this is done to ensure that the asset management system is not inundated with data that needs action, or data that is not useful for analysis. In such systems, there is a need to match the physical assets to the sensors monitoring them, so that the asset can be maintained based on the sensor data analysis.

Currently in the industry, sensors attached to physical assets are used to send data to asset management systems. Reliability engineers and IT departments spend a great deal of time manually associating sensors to business objects in the asset management system; this mapping is performed by matching devices listed on spreadsheets to assets, and manually entering the device identification of the associated asset or sensor. This process may be required for thousands of devices and is not only difficult and tedious, which leads to errors, but is also time consuming. In the case of a composite feed, where one feed consists of multiple readings for an asset, the mapping becomes even more complicated and error-prone because each reading may map to a different sensor. Efforts in implementing solutions in the prior art have been so far been small in scale, largely limited to straightforward matching exercises, where data must match information in a database or a mapping cannot be completed. As such, it may be advantageous to, among other things, implement a system that can be scaled to encompass and learn from data provided by multiple asset management systems, and which utilizes cognitive learning as well as provided information to make inferences from potentially incomplete data regarding the correct mapping of assets to sensors, and providing useful guidance to users even in the absence of exact matches.

According to one embodiment, the invention is a method of matching sensors to physical assets and sending commands to electronic devices associated with a physical asset based on the sensor data. For instance, the method may group sensors according to location, similarity of data, similarity of data structures (for example, 3 readings in the form of numerals, 2 readings in the form of characters), or similarity of data ranges. The method further utilizes cognitive learning in order to analyze the historian data and adjust grouping data based on past successes in order to improve the efficiency and effectiveness of the method. The method may also, based on the sensors matched to the physical asset, send commands to electronic devices associated with the physical asset, or to the physical asset itself where the physical asset is capable of sending and receiving commands (e.g., asset is a car, weather monitoring station, e.t.c.).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize cognitive learning and asset data to identify possible groupings for assets and sensors, and thereby map each asset to its corresponding sensor, and where such matching is impossible, suggest likely pairings to the user.

Referring to FIG. 1, an exemplary networked computer environment 100 is depicted, according to at least one embodiment. The networked computer environment 100 may include client computing device 102 and any number of servers 112 interconnected via a communication network 114. According to at least one implementation, the networked computer environment 100 may include a plurality of client computing devices 102 and servers 112, of which only one and two of each respectively are shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run an asset management system 108 and a cognitive sensor mapping program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a cognitive sensor mapping program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The sensor 118 may be any device capable of detecting or measuring physical properties, and transmitting measurements to Asset Management System 108 and/or cognitive sensor mapping program 110A, 110B via network 114. Sensor 118 may be attached to a physical asset. For example, sensor 118 may be a security camera attached to a building, a tachometer integrated into a vehicle, a barometer in an environmental monitoring station, a touch sensor integrated into an automatic door in a supermarket, etc. According to at least one implementation, the networked computer environment 100 may include a plurality of sensors 118, of which only one is shown for illustrative brevity.

Asset management system 108 may be any system capable of monitoring or receiving information from one or more physical assets, by communicating with one or more sensors 118 which are associated with (e.g., physically attached to) said assets. The asset management system 108 may be located on client computing device 102 or server 112 or on any other device located within network 114. Furthermore, asset management system 108 may be distributed in its operation over multiple devices, such as client computing device 102 and server 112.

According to the present embodiment, the cognitive sensor mapping program 110A, 110B may be a program enabled to utilize cognitive learning and asset data to identify possible groupings for assets and sensors, and thereby map each asset to its corresponding sensor, and where such matching is impossible, suggest likely pairings to the user. The cognitive sensor mapping program 110A, 110B may be a discrete program or a subroutine or method integrated into asset management system 108. The cognitive sensor mapping program 110A, 110B may be located on client computing device 102 or server 112 or on any other device located within network 114. Furthermore, cognitive sensor mapping program 110A, 110B may be distributed in its operation over multiple devices, such as client computing device 102 and server 112. The cognitive sensor mapping method is explained in further detail below with respect to FIG. 3.

Figure 2:
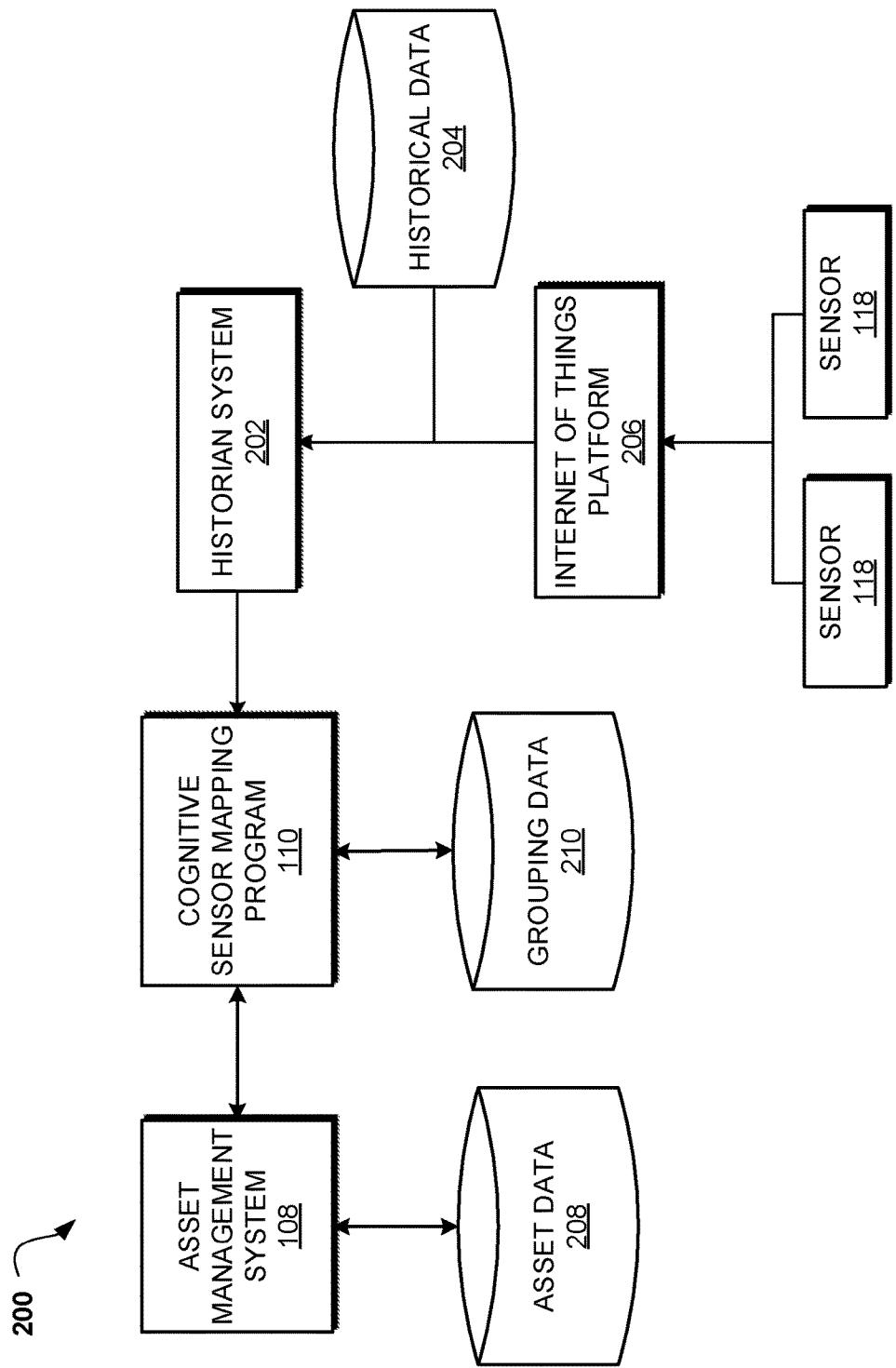
FIG. 2 is an operational flowchart illustrating a cognitive sensor mapping process according to at least one embodiment.

Referring to FIG. 2, a block diagram of an exemplary computing environment 200 is depicted, according to at least one embodiment. The computing environment 200 may include cognitive sensor mapping program 110, asset management system 108, a historian system 202, and an internet of things platform, as well as sensors 118 and databases containing historical data 204, asset data 208, and grouping data 210. According to at least one implementation, the computer environment 200 may include any number of sensors 118, of which only two are shown for illustrative brevity.

Historian system 202 may be a system or program that stores the historical data 204 and employs data aggregation techniques to identify data from the historical data 204 that is needed for further analysis, and feed said data to cognitive sensor mapping program 110. Historical data 204 may be all data from sensors 118 generated over a span of time, such as the operational lifespan of the system, and may be supplied by Internet of Things Platform 206. Historical data 204 may further be sourced from multiple asset management systems 108, or multiple Internet of Things Platforms 206. Historian system 202 may be a subroutine of, integrated with, or called by Internet of Things Platform 206. Internet of Things Platform 206 may be a middleware program or system which interfaces with sensors 118 and collects the sensor data for storage and analysis, as well as interfacing with Asset Management System 108.

Asset data 208 may be data pertaining to the assets associated with Asset Management System 108, such as which sensor or sensors 118 are monitoring the asset, sensor 118 and/or asset location, identifying information such as serial numbers or ID codes, descriptive data, number or type or general output characteristics (type of data, range of data, etc.) of sensors associated with the asset, and so forth. Asset data 208 may be pre-supplied to Asset Management System 108 or cognitive sensor mapping program 110.

Grouping data 210 may be the data pertaining to the historical groupings formed by cognitive sensor mapping program 110, where the groupings may each consist of one asset and a number of sensors that are associated with that asset. The cognitive sensor mapping program 110 may change the grouping data 210 to improve it over time, as successful mappings are achieved and particular groupings and grouping criteria are shown to be more or less effective. Grouping data 210 may be sourced from multiple cognitive sensor mapping programs 110A, 110B and/or multiple asset management systems 108.

Figure 3:
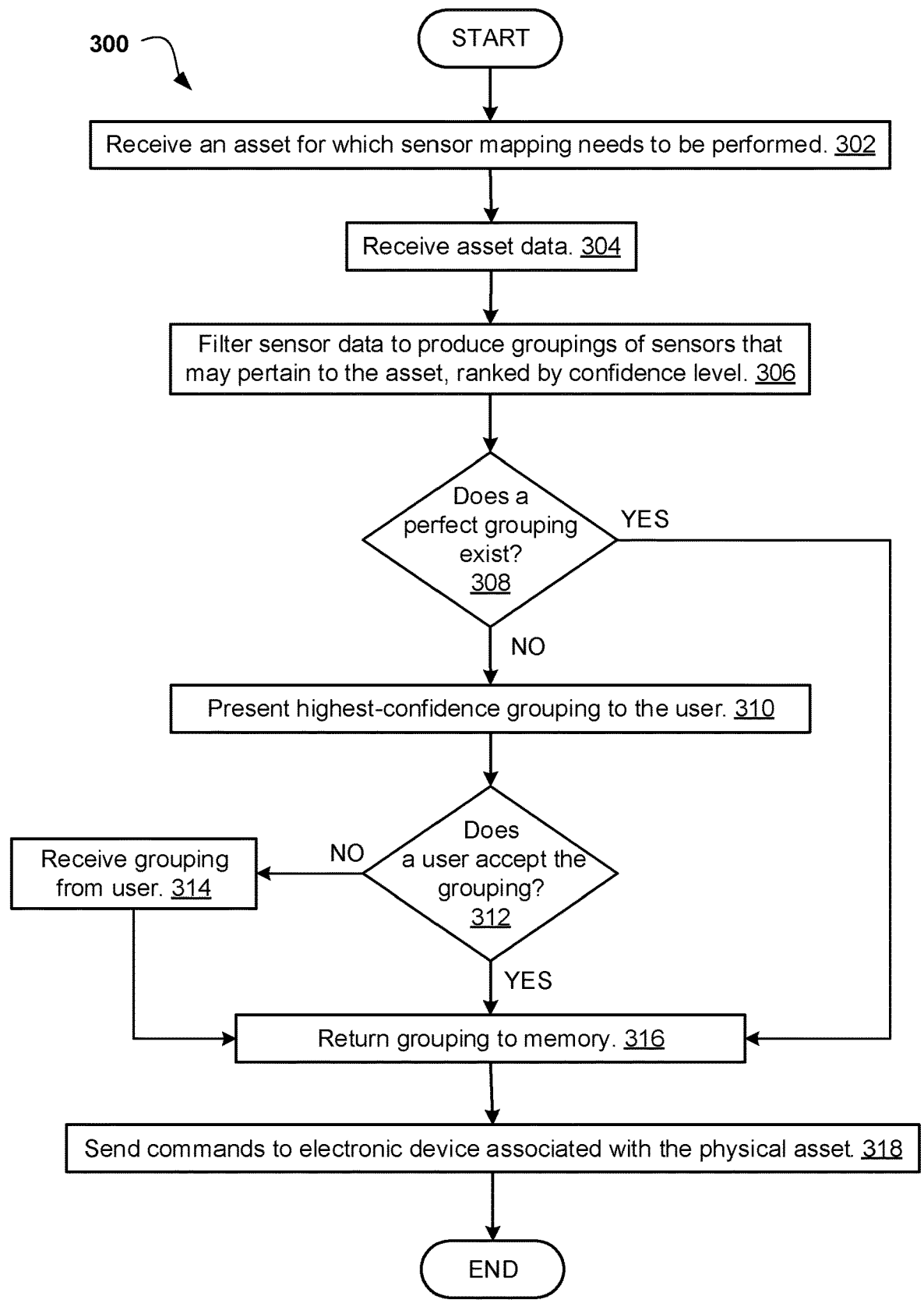
FIG. 3 is a block diagram illustrating an exemplary computing environment according to at least one embodiment.

Referring now to FIG. 3, an operational flowchart illustrating a cognitive sensor mapping process 300 is depicted according to at least one embodiment. At 302, the cognitive sensor mapping program 110A, 110B receives an asset for which sensor mapping needs to be performed. These assets may be supplied by a user, by Asset Management System 108, or, in embodiments where cognitive sensor mapping program 110A, 110B has access to a searchable database of asset data 208, may be identified via a search run by a user or in response to a user query (for example, the user may specify "all assets in site Bedford," and may return a list of assets located in Bedford that are then identified for mapping).

At 304, cognitive sensor mapping program 110A, 110B receives asset data. The asset data 208 may pertain to the asset identified for mapping. The cognitive sensor mapping program 110A, 110B may receive asset data from and/or in response to a request to asset management system 108, Internet of Things Platform 206, and/or historian system 202.

At 306, cognitive sensor mapping program 110A, 110B filters sensor data to produce groupings of sensors that may pertain to the asset, ranked by confidence level. The sensor data may be any data gathered by sensor 118, that may pertain to the identified asset, and may include real-time readings and/or historical data 204.

The cognitive sensor mapping program 110A, 110B may filter the sensor data by searching grouping data 210 for prior knowledge of successful mappings. For instance, if the grouping data 210 identifies a thermometer, barometer, and seismic sensor as being associated with the asset, cognitive sensor mapping program 110A, 110B may filter the sensor data to data output by the specific thermometer, barometer, and seismic sensor, and produce a grouping.

The cognitive sensor mapping program 110A, 110B may filter by data; for instance, if the asset data 208 reveals that a vehicle asset has a certain average mileage per gallon, cognitive sensor mapping program 110A, 110B may search for that particular number among sensor data to identify a mileage sensor attached to that vehicle.

The cognitive sensor mapping program 110A, 110B may filter by location; if the location of the asset is known, cognitive sensor mapping program 110A, 110B may filter by all sensors in that same location, or in a location within a certain threshold of the asset location.

The cognitive sensor mapping program 110A, 110B may also filter by configuration; for instance, if the asset data 208 reveals that the asset has 5 meters, cognitive sensor mapping program 110A, 110B may search for sensor data feeds with 5 attributes.

The cognitive sensor mapping program 110A, 110B may also filter by data type; for instance, if asset data 208 reveals that the asset has 3 readings of numerical values, and 2 readings in the form of characters (for instance yes/no, on/off), cognitive sensor mapping program 110A, 110B may search for sensors with numerical values and character values as outputs, and may further ensure that the grouping consists of three sensors outputting numerical values and 2 outputting characters.

The cognitive sensor mapping program 110A, 110B may further filter by data ranges; for instance, if the asset data 208 indicates on/off values in the meter data from the asset, cognitive sensor mapping program 110A, 110B may search the sensor data for sensors that produce only "on" and "off" outputs. In another example, if the asset data 208 indicates temperature values in Fahrenheit for an asset, cognitive sensor mapping program 110A, 110B may search the sensor data for sensor output between 1-3 numerals long, which may include negative values.

Any number or combination of these filters may be employed to produce groupings, as well as any additional filters. Any number of groupings may be produced via these filters, and may be ranked according to a confidence level, which reflects the likelihood that the grouping is a correct and complete match between sensors and the asset. This confidence level may be based on the number of filters used to produce the grouping, and/or the type of filters used to produce the grouping (location may be more valuable, for instance, in mapping sensors to an asset than whether the sensors output similar data types), and/or the number of sensors of a known total number of sensors that can be matched to the asset via the sensor data. In some cases, a perfect grouping may exist, for instance where grouping data 210 contains a grouping that was an exact match for the asset in an earlier mapping, or where asset data 208 indicates 3 sensors associated with the asset and only three sensors are located close to the asset. In these cases, the confidence level may be at 100%.

At 308, the cognitive sensor mapping program 110A, 110B determines whether a perfect grouping exists. A perfect grouping is a grouping that is certain, or within a pre-supplied threshold of likelihood, to correctly map an asset to its sensors. A perfect grouping exists where the confidence level for a grouping is at 100%, or within a range of confidence exceeding the pre-supplied threshold of likelihood. According to one implementation, if the cognitive sensor mapping program 110A, 110B determines that a perfect grouping does exist, (step 308, "YES" branch), the cognitive sensor mapping program 110A, 110B may continue to step 316 to return the grouping into memory. If the cognitive sensor mapping program 110A, 110B determines that a perfect grouping does not exist (step 308, "NO" branch), the cognitive sensor mapping program 110A, 110B may continue to step 310 to present the highest confidence grouping to the user.

At 310, cognitive sensor mapping program 110A, 110B presents the highest-confidence grouping to the user. In some embodiments, cognitive sensor mapping program 110A, 110B may return some number of groupings to the user based on confidence; for instance, cognitive sensor mapping program 110A, 110B may return the three highest-confidence groupings, or may return all groupings that exceed a certain pre-supplied confidence level. For example, cognitive sensor mapping program 110A, 110B may present to the user all groupings that exceed 85% confidence.

At 312, the cognitive sensor mapping program 110A, 110B determines whether a user accepts the grouping. The cognitive sensor mapping program 110A, 110B may determine if the user accepts the grouping by presenting to the user a graphical prompt, such as a text box, check mark, button, etc. on client computing device 102, or by soliciting a response by SMS, email, instant messenger, or any other method of graphically interfacing with the user. According to one implementation, if the cognitive sensor mapping program 110A, 110B determines that the user does accept the grouping, (step 312, "YES" branch), the cognitive sensor mapping program 110A, 110B may continue to step 316 to return the grouping to memory. If the cognitive sensor mapping program 110A, 110B determines that the user does not accept the match (step 312, "NO" branch), the cognitive sensor mapping program 110A, 110B may continue to step 314 to receive a grouping from the user. In some embodiments, cognitive sensor mapping program 110A, 110B may determine whether the user accepts one of several groupings, or multiple groupings. In some embodiments, the user may accept a portion of the grouping, in which case cognitive sensor mapping program 110A, 110B may return to Step 306 to filter sensor data to produce groupings of sensors that may pertain to the asset, ranked by confidence level, may present to the user some number of other groupings, potentially based on confidence level, containing the accepted subset of sensors, or may solicit a completed grouping from the user.

At 314, cognitive sensor mapping program 110A, 110B receives a grouping from the user. In situations where cognitive sensor mapping program 110A, 110B fails to present a grouping that is accepted by the user, cognitive sensor mapping program 110A, 110B may solicit the user to perform a manual grouping of the asset and the sensors and return it to cognitive sensor mapping program 110A, 110B. In this way, cognitive sensor mapping program 110A, 110B may learn from situations where it cannot correctly identify the matching, enabling it to grow in capability as time goes on.

At 316, cognitive sensor mapping program 110A, 110B returns the grouping to memory. Here, the grouping is stored in grouping data 210, so that cognitive sensor mapping program 110A, 110B may learn from successful groupings to improve future searches and analysis of sensor data. In situations where a mapping is stored that conflicts with prior knowledge, cognitive sensor mapping program 110A, 110B may assign a weight that enumerates the likelihood of a certain mapping being chosen based on the past mappings. For example, if an asset is grouped with a red color sensor for the first two matches, then is grouped with a blue color sensor for the third match, the next search of that asset would weight the grouping with the red color sensor at 66%, and the grouping with the blue color sensor at 33%. Below is presented an additional example of how cognitive sensor mapping program 110A, 110B might learn according to one or more embodiments:

Cognitive sensor mapping program 110A, 110B presents the following groups to the user for a mapping of Asset A1 to Sensor S1:
  A1-S1=>match by location=>90%
  A1-S1=>match by sensor pressure reading=>50%
  A1-S2=>match by sensor data range temp between 100-120=>40%

The user does not select any of the choices, but selects something else to match A1 with S1. For example:
  A1-S1=>by user using the specific time when the sensor sent the data (ex: sensor sends data once every day) =>Cognitive system records this information for follow-on mapping.

Next time when user wants to map Asset A2 to Sensor S2, the cognitive sensor mapping program 110A, 110B presents the following groups based on previous knowledge it acquired:
  A2-S2=>match by location=>90%
  A2-S2=>Match by time of sending data=>70%
  A2-S2=>match by sensor pressure reading=>50%

At 318, cognitive sensor mapping program 110A, 110B may send commands to an electronic device associated with the physical asset. The electronic device may be capable of receiving commands from cognitive sensor mapping program 110A, 110B and may be integrated with network 114. The electronic device may be the physical asset itself, or something attached to the asset or associated with the asset in another way, for instance being independent from the physical asset but being designed to operate in and/or around the physical asset. For example, the asset could be a sensor station on Mars and the electronic device could be a rover operating near the sensor station and relying on navigation information from cameras on the sensor station. In another example, the electronic device could be a turret-mounted camera on a weather monitoring station (physical asset) that is moved to observe weather effects in different directions based on weather conditions reported from sensors attached to the weather monitoring station. Additionally, the physical asset could be the electronic device, for instance where the physical asset is an autonomous car. The cognitive sensor mapping program 110A, 110B may send the commands based on the sensor data. For instance, cognitive sensor mapping program 110A, 110B send commands to navigate an autonomous car based on the sensor data from a camera, accelerometer, and fuel meter associated with the car. In a further example, cognitive sensor mapping program 110A, 110B may direct flight-enabled autonomous drones to avoid certain regions within a warehouse based on temperature or wind conditions within particular rooms of the warehouse.

It may be appreciated that FIG. 2-3 provide only an illustration of one implementation and does not imply any limitations with regard to how different embodiments may be implemented. Many modifications to the depicted environments may be made based on design and implementation requirements. For instance, in some embodiments of the invention where only the highest of multiple groupings are presented to the user, and the user does not accept the presented groupings, cognitive sensor mapping program 110A, 110B may present lower-confidence groupings to the user before receiving a grouping from the user in step 214.

Figure 4:
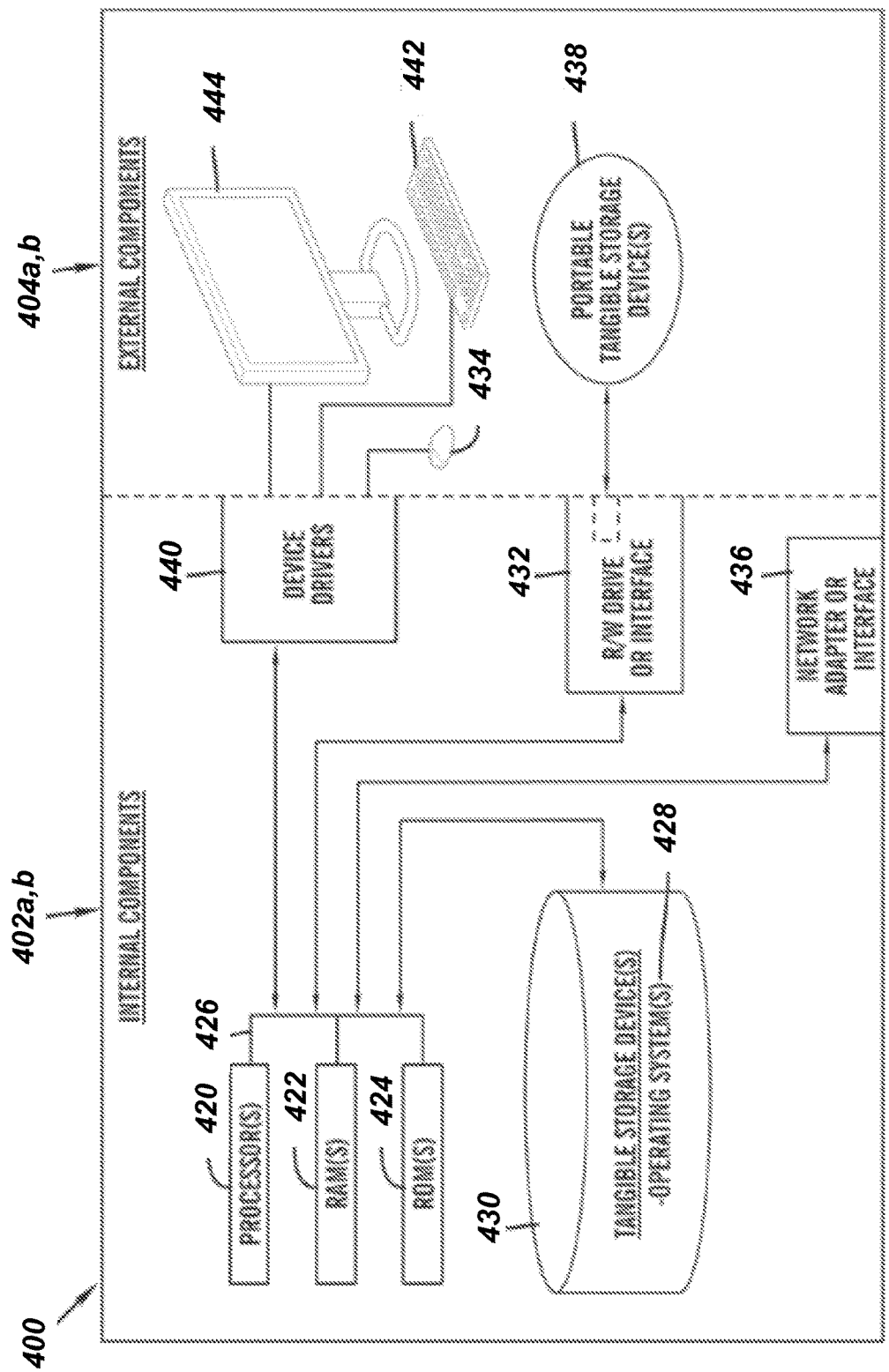
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the asset management system 108 and the cognitive sensor mapping program 110A in the client computing device 102, and the cognitive sensor mapping program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the cognitive sensor mapping program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The asset management system 108 and the cognitive sensor mapping program 110A in the client computing device 102 and the cognitive sensor mapping program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the asset management system 108 and the cognitive sensor mapping program 110A in the client computing device 102 and the cognitive sensor mapping program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
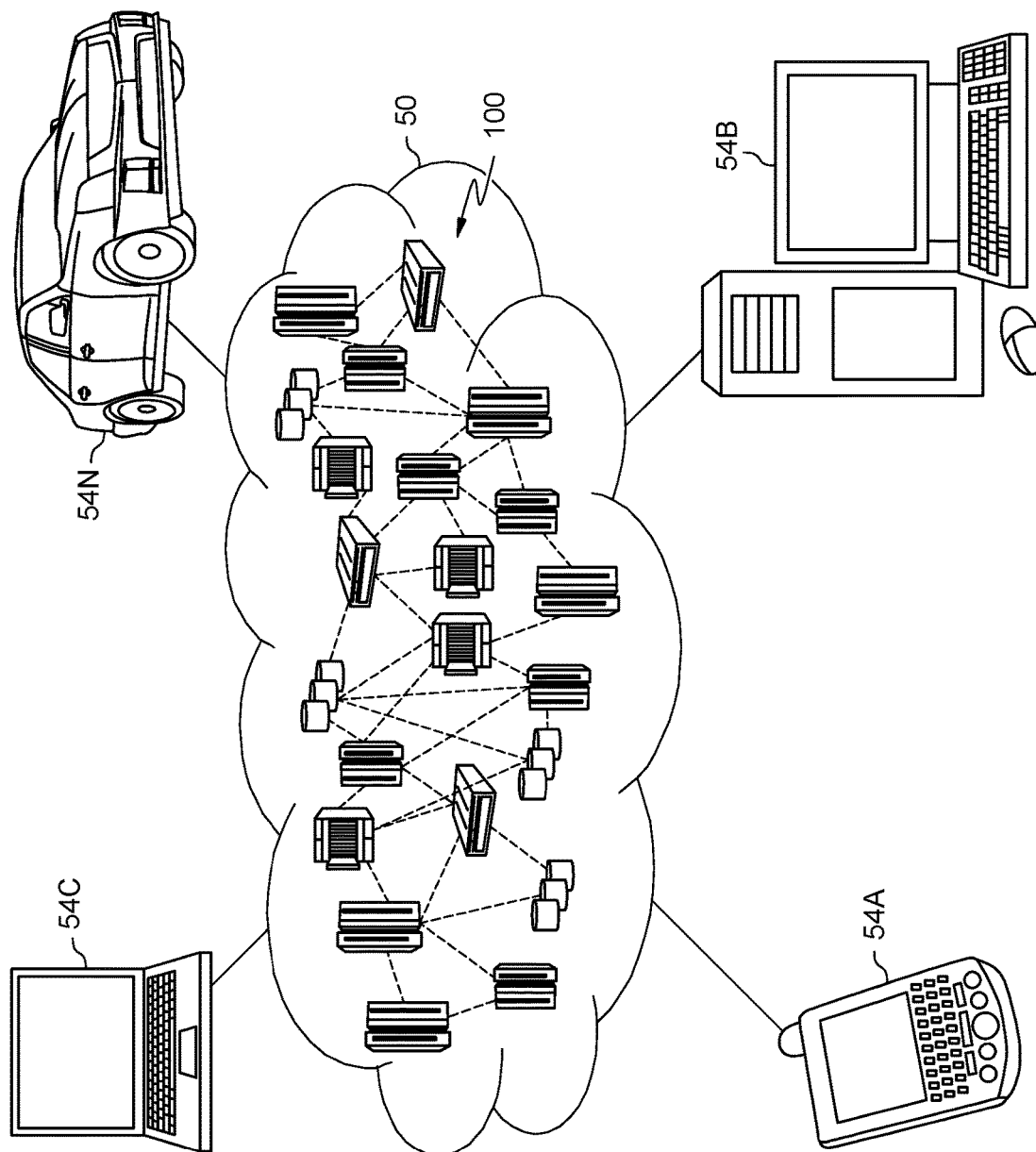
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
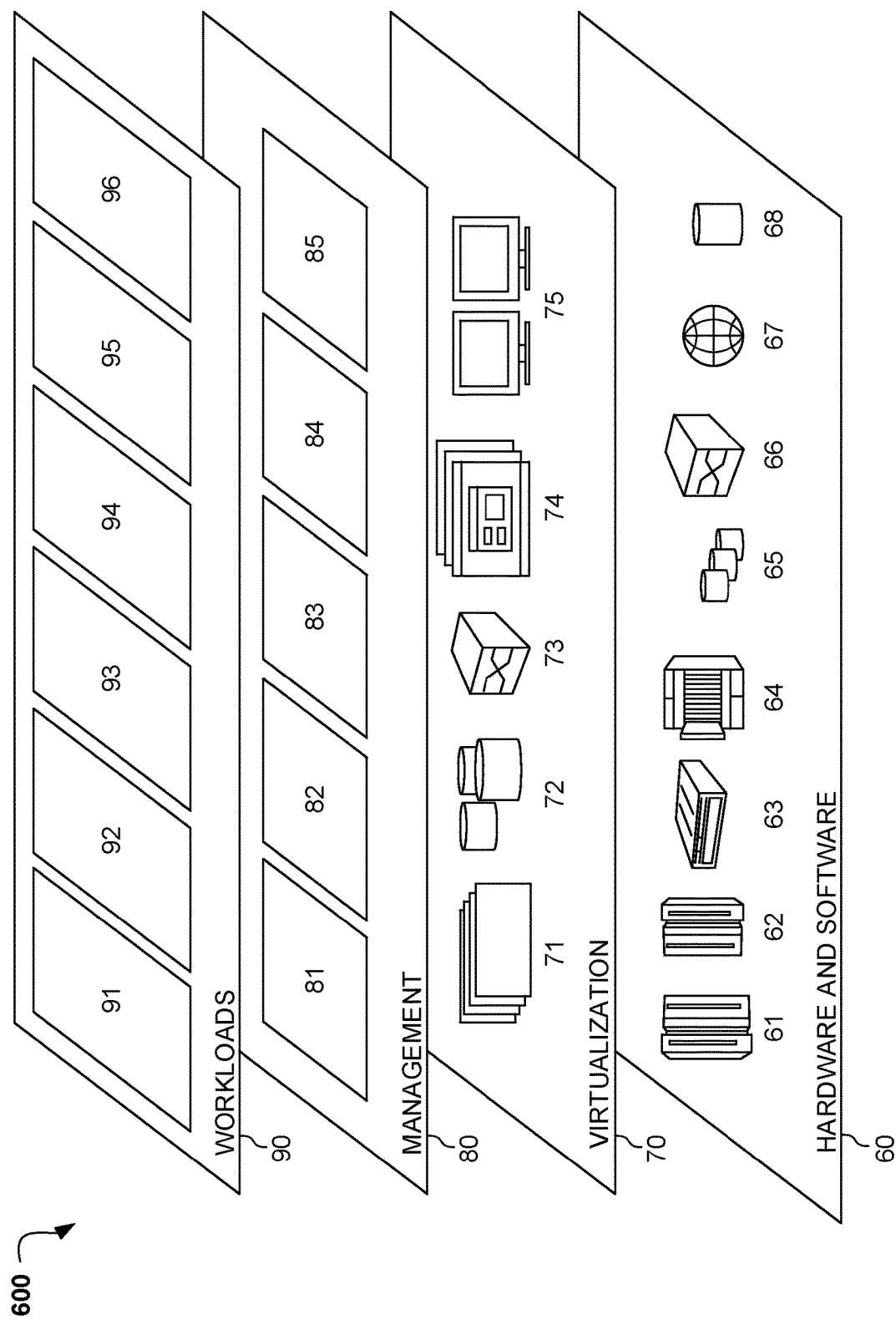
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive sensor mapping 96. The cognitive sensor mapping 96 may relate to controlling an electronic device associated with a physical asset based on a mapping of sensors to the asset utilizing cognitive learning and asset data to identify possible groupings for assets and sensors, mapping each asset to its corresponding sensor, and where matching is impossible, suggesting likely pairings to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for mapping one or more sensors to a physical asset, the method comprising:
   commanding, based on gathered sensor data, one or more electronic devices associated with the physical asset to perform one or more actions, wherein the gathered sensor data is received from one or more sensors mapped to the physical asset, the mapping comprising:
   creating two or more groupings, based on the gathered sensor data, a plurality of grouping data, and a plurality of asset data, wherein at least one grouping comprises the physical asset and the one or more sensors, and wherein the plurality of asset data pertains to the physical asset;
   ranking the two or more groupings by one or more confidence levels; and
   mapping the one or more sensors to the physical asset based on a user selection received in response to presenting, to a user, the two or more ranked groupings based on the one or more confidence levels.

2. The method of claim 1, further comprising:
   adding one or more groupings to the grouping data based on the user selection.

3. The method of claim 2, wherein the adding one or more groupings further comprises:
   adding at least one confidence level to the grouping data based on one or more groupings exceeding a confidence threshold.

4. The method of claim 2, wherein the adding one or more groupings further comprises:
   weighting at least one grouping by a number of similar groupings in the grouping data, based on two or more differing groupings pertaining to a single physical asset being added to the grouping data.

5. The method of claim 1, wherein the one or more groupings are created by filtering the gathered sensor data by one or more factors selected from a list consisting of:
   location of a sensor, data of a sensor, data type of a sensor, and data range of a sensor.

6. The method of claim 1, wherein the grouping data comprises data from a plurality of asset management systems.

7. The method of claim 1, wherein the one or more confidence levels are created based on one or more factors selected from a list consisting of:
   number of filters used to produce the grouping, and type of filters used to produce the grouping.

8. A computer system for mapping one or more sensors to a physical asset, the computer system comprising:
   one or more processors, one or more computer-readable memories, one or more sensors, one or more physical assets, one or more computer-readable tangible storage medium, and program instructions stored on at least one of the one or more tangible storage medium for execution by at least one of the one or more processors via at least one of the one or more memories, wherein the computer system is capable of performing a method comprising:
   commanding, based on gathered sensor data, one or more electronic devices associated with the physical asset to perform one or more actions, wherein the gathered sensor data is received from one or more sensors mapped to the physical asset, the mapping comprising:
   creating two or more groupings, based on the gathered sensor data, a plurality of grouping data, and a plurality of asset data, wherein at least one grouping comprises the physical asset and the one or more sensors, and wherein the plurality of asset data pertains to the physical asset;
   ranking the two or more groupings by one or more confidence levels; and
   mapping the one or more sensors to the physical asset based on a user selection received in response to presenting, to a user, the two or more ranked groupings based on the one or more confidence levels.

9. The computer system of claim 8, further comprising:
   adding one or more groupings to the grouping data based on the user selection.

10. The computer system of claim 9, wherein the adding one or more groupings further comprises:
    adding at least one confidence level to the grouping data based on one or more groupings exceeding a confidence threshold.

11. The computer system of claim 9, wherein the adding one or more groupings further comprises:
    weighting at least one grouping by a number of similar groupings in the grouping data, based on two or more differing groupings pertaining to a single physical asset being added to the grouping data.

12. The computer system of claim 8, wherein the one or more groupings are created by filtering the gathered sensor data by one or more factors selected from a list consisting of:
    location of a sensor, data of a sensor, data type of a sensor, and data range of a sensor.

13. The computer system of claim 8, wherein the grouping data comprises data from a plurality of asset management systems.

14. The computer system of claim 8, wherein the one or more confidence levels are created based on one or more factors selected from a list consisting of:
    number of filters used to produce the grouping, and type of filters used to produce the grouping.

15. A computer program product for mapping one or more sensors to a physical asset, the computer program product comprising:
    one or more computer-readable tangible storage medium and program instructions stored on at least one of the one or more tangible storage medium, the program instructions executable by a processor to cause the processor to perform a method comprising:
    commanding, based on gathered sensor data, one or more electronic devices associated with the physical asset to perform one or more actions, wherein the gathered sensor data is received from one or more sensors mapped to the physical asset, the mapping comprising:
    creating two or more groupings, based on the gathered sensor data, a plurality of grouping data, and a plurality of asset data, wherein at least one grouping comprises the physical asset and the one or more sensors, and wherein the plurality of asset data pertains to the physical asset;
    ranking the two or more groupings by one or more confidence levels; and
    mapping the one or more sensors to the physical asset based on a user selection received in response to presenting, to a user, the two or more ranked groupings based on the one or more confidence levels.

16. The computer program product of claim 15, further comprising:
  adding one or more groupings to the grouping data based on the user selection.

17. The computer program product of claim 16, wherein the adding one or more groupings further comprises:
  adding at least one confidence level to the grouping data based on one or more groupings exceeding a confidence threshold.

18. The computer program product of claim 16, wherein the adding one or more groupings further comprises:
  weighting at least one grouping by a number of similar groupings in the grouping data, based on two or more differing groupings pertaining to a single physical asset being added to the grouping data.

19. The computer program product of claim 15, wherein the one or more groupings are created by filtering the gathered sensor data by one or more factors selected from a list consisting of:
  location of a sensor, data of a sensor, data type of a sensor, and data range of a sensor.

20. The computer program product of claim 15, wherein the grouping data comprises data from a plurality of asset management systems.

* * * * *